A. O. HIGINBOTHAM.
RELIEF VALVE FOR COMPRESSOR SYSTEMS.
APPLICATION FILED MAY 1, 1914.
1,212,951.
Patented Jan. 16, 1917.
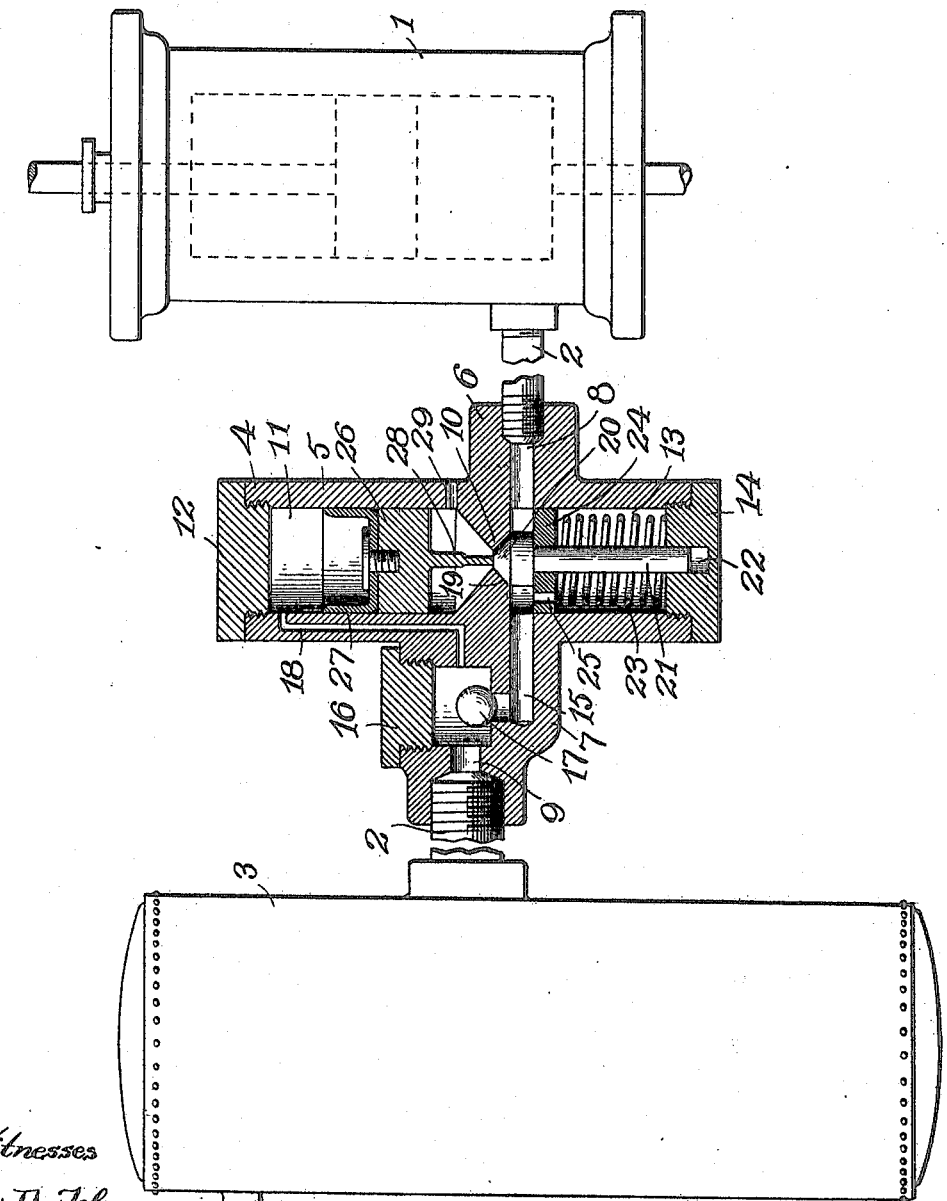

UNITED STATES PATENT OFFICE.

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE.

RELIEF-VALVE FOR COMPRESSOR SYSTEMS.

1,212,951.      Specification of Letters Patent.      Patented Jan. 16, 1917.

Application filed May 1, 1914. Serial No. 835,655.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Relief-Valves for Compressor Systems, of which the following, together with the accompanying drawings, is a specification.

The present invention relates to a valve for controlling the pressure of air supplied to a compressed air storage tank, and it is particularly adapted for use in compressed air systems such as are used in the starting of motor vehicles. It is customary in such systems to employ a compressor in constant connection with the shaft of the engine of the vehicle, and to store the air thus compressed, whenever the engine is running, in a suitable tank or storage reservoir. In order to prevent the creation of an excess pressure in the tank, due to a long continued running of the engine, it is has been found desirable to interpose a relief valve in the pipe line between the compressor and the storage tank, adapted to interrupt the flow of compressed air to the tank when the pressure therein reaches a predetermined point, and to restore the flow of compressed air to the tank when the pressure therein falls below a predetermined point.

In the accompanying drawings, the figure discloses a longitudinal sectional view of a valve constructed in accordance with my invention, the same being shown in a system containing a compressor and a storage tank.

The numeral 1 indicates an air compressor, which is adapted to have its piston directly connected to a source of power, not shown, such for instance, as the shaft of an engine used in the propulsion of a vehicle. The compressed air is conveyed through suitable piping 2 to a storage tank 3 of the desired capacity, and a valve device, indicated as a whole by the numeral 4, is interposed in the piping 2 between the compressor 1 and tank 3.

The valve device 4 comprises a hollow cylindrical casing 5, provided with bosses 6 and 7 on opposite sides, the boss 6 having an inlet passage 8 adapted to connect the interior of casing 5 with the piping 2 leading from the compressor 1, and the boss 7 having an outlet passage 9 adapted to connect the interior of the casing 5 with the piping leading to the tank 3.

The interior of the casing 5 is provided with a partition 10, dividing the same into an upper chamber 11, closed by a screw cap 12, and a lower chamber 13 closed by a screw cap 14. The passage 8 opens into the chamber 13, and a passage 15 leads from the chamber 13 to a check valve chamber 16 formed in the boss 7 and in communication with the outlet passage 9. The chamber 16 contains a ball check valve 17, seated by gravity to prevent the return of compressed air from the tank 3, but adapted to be lifted by the pressure of the air to permit the passage thereof to the tank. A passage 18, formed in the walls of the casing 5, maintains a constant communication between the chamber 16 and the chamber 11.

The partition 10 is centrally apertured, and on its under side around the aperture is provided with a recess forming a tapered valve seat 19, with which a conical valve 20 coacts to close communication through said aperture in the normal operation of the valve. The valve 20 has projecting from its under side a stem 21, the lower end of which enters a guiding recess 22 formed in the closing cap 14. A spiral spring 23, contained within the chamber 13 and confined between the inner side of cap 14 and a plate 24 on the valve stem, yieldingly maintains the valve against its seat 19. The plate 24 has a sliding fit within the chamber 13 and thereby provides for the guiding of the valve 20 in alinement with its seat 19. An aperture 25 in said plate 24 serves to equalize the pressure on opposite sides of said plate.

The upper chamber 11 contains a piston 26, provided with a suitable packing 27 and having a downward extension 28 of reduced section, adapted to contact with the upper side of valve 20 and to pass through the aperture in partition 10 when the piston 26 is lowered. The chamber 11 below the piston 26 is in constant communication with the atmosphere through an opening 29.

In the operation of the device, the air from the compressor passes through the passage 8, around the body of valve 20 and through the passage 15, lifting the check valve 17 and entering the tank 3. Obviously, the pressure above the piston 26 in the chamber 11 is the same under all conditions, as the pressure of the air accumulated in the tank 3, and as the pressure in the tank increases, the piston 26 correspondingly exerts an increasing force to lower the valve 20 away from its seat 19. This force is resisted by the spring 23 plus the pressure of air below the valve when the same is closed, to hold it in closed position. Assuming that it is desired to build up a pressure of approximately one hundred pounds in the tank, the spring 23 will be designed to exert a force of approximately ninety pounds, while the valve and its associated parts will be designed so that the excess of pressure tending to hold the same closed over the pressure tending to open the same will be approximately ten pounds. When the pressure built up in the tank exceeds one hundred pounds, the piston 26 forces the valve open; the pressure within the chamber 13 immediately drops to approximately atmospheric, due to the communication thereby effected with the atmosphere, by the opening of the valve. Consequently, the spring alone exerts a closing force on the valve, and this force is not sufficient to close the same until the tank pressure, through leakage, or use of the pressure medium, falls below ninety pounds. The compressor is thereby relieved of the necessity of working against the high tank pressure, since the air exhausted from said compressor has a free passage to the atmosphere. Obviously, in the application of this invention to systems of comparatively high pressure, the opening controlled by the valve 20 must be increased in size in order to permit unrestricted passage of the air to the atmosphere when the valve is open. In such cases the desired small increment of pressure to assist the spring 23 in holding the valve closed may readily be obtained by employing a substantially balanced valve, of well known construction, the area upon which upward pressure is exerted being slightly in excess of the area upon which downward pressure is exerted, when the valve is closed.

I claim:

1. A relief valve for compressor systems, comprising a passage for connecting a compressor and a storage tank, a chamber in communication with said storage tank having a valve controlled opening for connecting it with said passage, and having an opening to the atmosphere, and means actuated by a predetermined pressure of air in said chamber for exhausting the air from said compressor through said valve controlled opening to the atmosphere.

2. A relief valve for compressor systems, comprising a passage for connecting a compressor and a storage tank, a chamber having an opening into said passage and an opening to the atmosphere, a valve for normally closing said first mentioned opening, a passage connecting said chamber with said storage tank, and a piston within said chamber having an extension adapted to open said valve when the pressure of air in said tank reaches a predetermined point.

Dated this 25th day of April, 1914.

ARTHUR O. HIGINBOTHAM.

Witnesses:
 PENELOPE COMBERBACH,
 NELLIE WHALEN.

Copies of this patent may be obtained for five cents each, by addressing the "Commissioner of Patents. Washington, D. C."